(No Model.)
S. FINE & M. F. LOCKE.
Vegetable Grater.
No. 231,416. Patented Aug. 24, 1880.
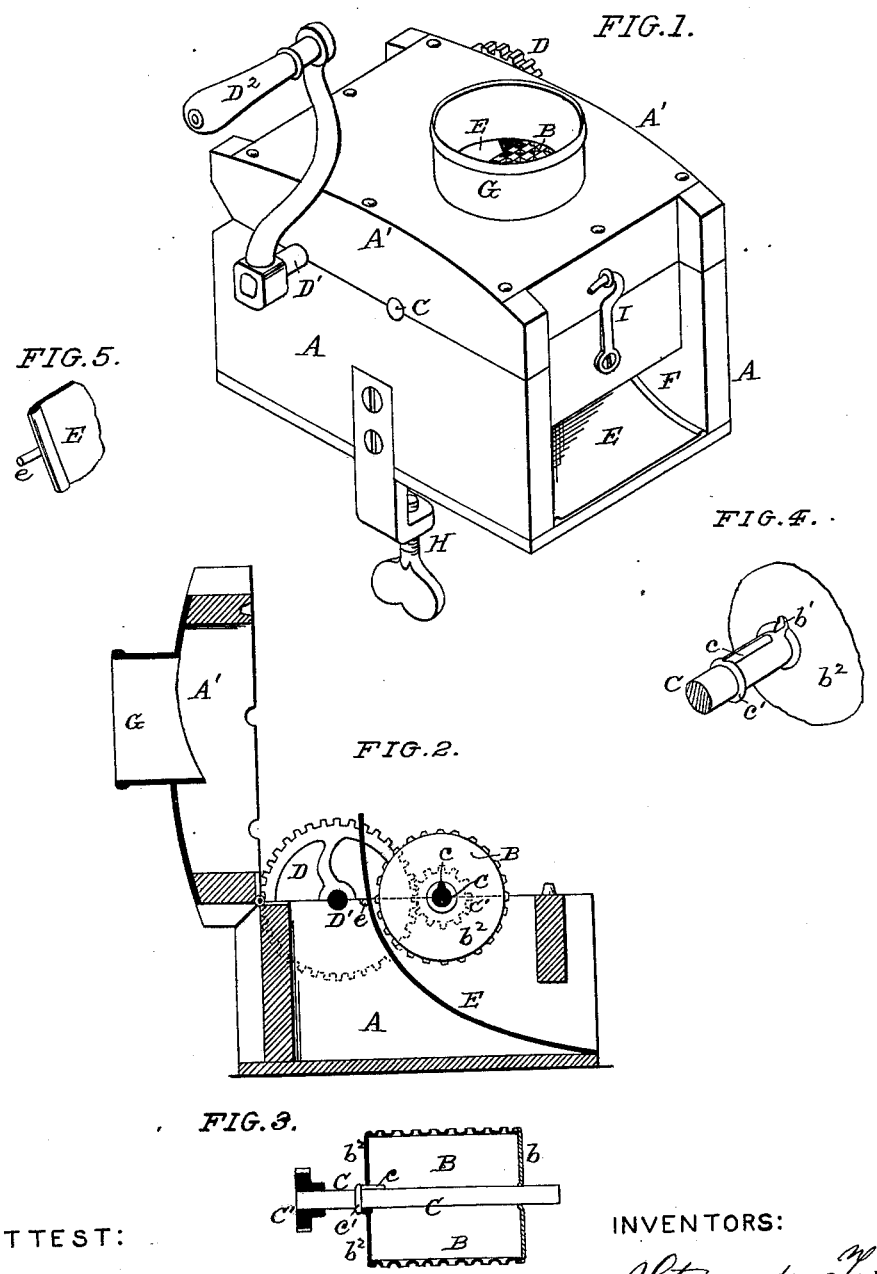

UNITED STATES PATENT OFFICE.

STEWART FINE AND MILLARD F. LOCKE, OF ST. LOUIS, MISSOURI.

VEGETABLE-GRATER.

SPECIFICATION forming part of Letters Patent No. 231,416, dated August 24, 1880.

Application filed April 30, 1880. (No model.)

*To all whom it may concern:*

Be it known that we, STEWART FINE and MILLARD F. LOCKE, of St. Louis, in the State of Missouri, have invented certain new and useful Improvements in Vegetable-Graters; and we do hereby declare that the following is a full, clear, and exact description of the same, reference being had to the accompanying drawings, and to the letters of reference marked thereon.

The object of this invention is to provide a grater for vegetable and other substances of a cheap, durable, and effective construction, and having its parts so arranged that they can be easily and readily taken apart when it is desired to clean the same; and this invention consists in the construction and arrangement of parts to effect the above purpose, as will hereinafter more fully appear.

In the drawings, Figure 1 is a perspective view of our improved grater. Fig. 2 is a vertical section with the top portion lifted up to allow the moving parts, &c., to be removed. Fig. 3 is a transverse section of the grater-cylinder with its supporting-shaft. Fig. 4 is a detail perspective view of the mode of securing the grater-cylinder to its operating-shaft, and Fig. 5 is a detail perspective view of a portion of the curved guide-partition.

The casing of the grater is divided horizontally into a top and bottom portion, A A', which are hinged together at the back. The journals for the operating-shafts of the grater-cylinder and driving-gear are formed at the division, so that one half of the journals will be in the upper part, A', and the other half in the lower part, A, the purpose being to allow the ready removal of the grater-cylinder, &c., when it is desired to clean the same.

The grater-cylinder B is formed of perforated tin or other suitable material, with the burrs of the perforations projecting outwardly, so as to form the grating-surface. One head, $b$, of the cylinder is made removable, to allow of access to the interior of the cylinder for cleaning purposes.

The grater-cylinder is arranged in a horizontal position in the casing, and is secured to its operating-shaft C by means of a key or spline, $c$, which enters a seat or notch, $b'$, in the fixed head $b^2$ of the grater-cylinder.

$c'$ is a collar on the shaft to prevent end motion of the cylinder on said shaft.

The shaft C is provided with a pinion, C', which gears with and is driven by a spur-gear, D, on a driving-shaft, D', provided with a suitable hand-crank, D², as clearly indicated in the drawings.

E is a curved partition, extending across the interior of the casing, and forming a chute for conducting the grated material as it comes from the grater out of the machine through an opening, F, at front, as shown in Figs. 1 and 2. This partition is also made removable for cleaning purposes, and in order to hold it in place when in use it is provided with projecting ears or lugs $e$, which lie in recesses in the side pieces of the casing part A, and are held in position by the top part, A', when it is in its closed position.

G is a hopper for feeding the vegetable or other substance to the grater-cylinder.

H is a clamping-screw for securing the machine to a table, &c., when in use.

I is a latch or hook for securing the parts A A' firmly together, so as to retain the operating parts in their proper position.

Having thus fully described our said invention, what we claim, and desire to secure by Letters Patent, is—

The combination, with casing A A', grater-cylinder B, and hopper G, of the removable curved partition E, having side lugs, $e$, which are engaged by the parts A A' to hold the partition in place, as and for the purpose set forth.

In testimony whereof we have hereunto set our hands this 26th day of April, 1880.

STEWART FINE.
MILLARD F. LOCKE.

In presence of—
HENRY UNGERMAN,
GEORGE BUETTNER.